Jan. 3, 1967   G. H. CRAIG ETAL   3,296,010
METHOD OF APPLYING REFLECTORIZING COATINGS
Filed July 24, 1963   2 Sheets-Sheet 1

Inventors
George H. Craig
Charles A. Racz
Vernon E. Coleman
By Merriam, Smith & Marshall
Attorneys

United States Patent Office 3,296,010
Patented Jan. 3, 1967

3,296,010
METHOD OF APPLYING REFLECTORIZING COATINGS
George H. Craig, Hammond, and Charles A. Racz, Griffith, Ind., and Vernon E. Coleman, Thornton, Ill., assignors to Inland Steel Company, Chicago, Ill., a corporation of Delaware
Filed July 24, 1963, Ser. No. 297,250
7 Claims. (Cl. 117—33)

This invention relates to a method for applying a reflectorizing coating of minute beads composed of glass or the like to a surface on an elongated article having an irregular lateral cross-section which varies in thickness, and more particularly to a method in which the surface to be coated is immersed into an expanded bed of beads maintained in a condition of incipient fluidization.

The use of small glass beads to produce reflectorized coatings on various objects is well known. Such coatings typically consist of a layer of very small diameter beads held in a suitable binder, typically an organic resin, to produce a layer which reflects light very efficiently. Known or conventional methods of applying the glass beads to the desired surface include applying the binder, in a tacky condition, to the surface to be coated, and then blowing or sprinkling the beads onto the tacky binder, or inserting the object to be coated directly into a totally quiescent supply of beads.

However, these known methods are not suitable for use in applying such reflectorizing coatings on a mass production basis to elongated articles having irregular lateral cross-sectional shapes. Blowing the beads onto an irregular surface entails difficulties in applying a uniform coating and in avoiding loss of beads. Sprinkling the irregular article's surface entails similar difficulties and requires too long a time. Dipping the article directly into a totally quiescent supply of beads is unsatisfactory because an uneven coating is produced as a result of friction between the initially-applied beads and the tightly-packed beads remaining in the quiescent supply, as the article is being withdrawn from the supply.

In accordance with the present invention, there is provided a method for applying a uniform, smooth coating of reflectorizing beads onto a surface which may have complex contours in a manner which is rapid and efficient and which minimizes the loss of material.

Other features and advantages are inherent in the method claimed and disclosed or will become apparent to those skilled in the art from the following detailed description in conjunction with the accompanying diagrammatic drawings wherein:

Figure 4:
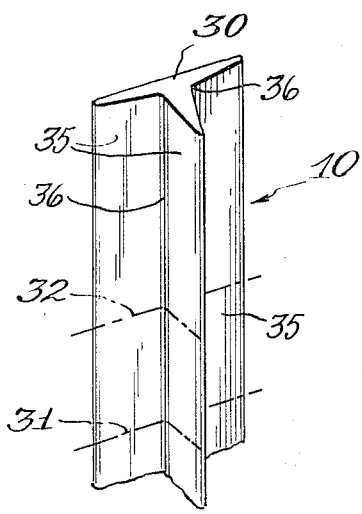
FIGURE 4 is a fragmentary perspective view illustrating a typical elongated article having complex contours or an irregular lateral cross-sectional shape, such as a T-shaped fence post, to be coated in accordance with the method of the present invention.

In a typical embodiment of a method in accordance with the present invention, an elongated article such as T-shaped fence post 10 (FIG. 4), having complex contours or an irregular lateral cross-sectional shape, is coated with a tacky binder, such as paint or other conventional pigmented binder, along part of the length thereof adjacent an end 30 thereof, or along the entire length thereof, as desired. As illustrated in FIGURE 4, article 10 is a conventional T-shaped fence post, typically formed from rolled metal such as steel. End 30 of article 10 is the same shape as the lateral cross-section of elongated article 10, which cross-section varies in thickness, as shown in FIGURE 4, and includes a plurality of flanges 35, any two of which are joined at an inside corner 36. At least a portion of the binder-covered part of article 10 is then immersed, with end 30 pointing downwardly, into an expanded bed of reflectorizing beads maintained in a condition of incipient fluidization. The immersion requires only a few seconds, and is, in effect, substantially an instantaneous in-and-out operation. As a result of the immersion, the immersed portion of article 10 is coated with reflectorizing beads, and the coating of beads is uniformly one layer thick. Following immersion, the paint is allowed to dry, or the binder is allowed to harden or cure, as the case may be, depending upon the type of binder used.

The expanded bed of beads in a condition of incipient fluidization is achieved and maintained by establishing, within a suitable confining container holding the beads, an upwardly flowing current of gas at a controlled rate of gas flow. An apparatus for providing the expanded bed is indicated generally 11 in FIGURE 1.

Apparatus 11 includes an upper chamber 12, open at the top, and separated from a lower enclosed, air-tight chamber or plenum 14 by a separator or grid 15. Upper chamber 12 holds beads 13, and has a surrounding peripheral flange 17 which is secured to a corresponding peripheral flange 18 on lower chamber 14 by conventional connecting means such as bolts 19.

Figures 1, 2:
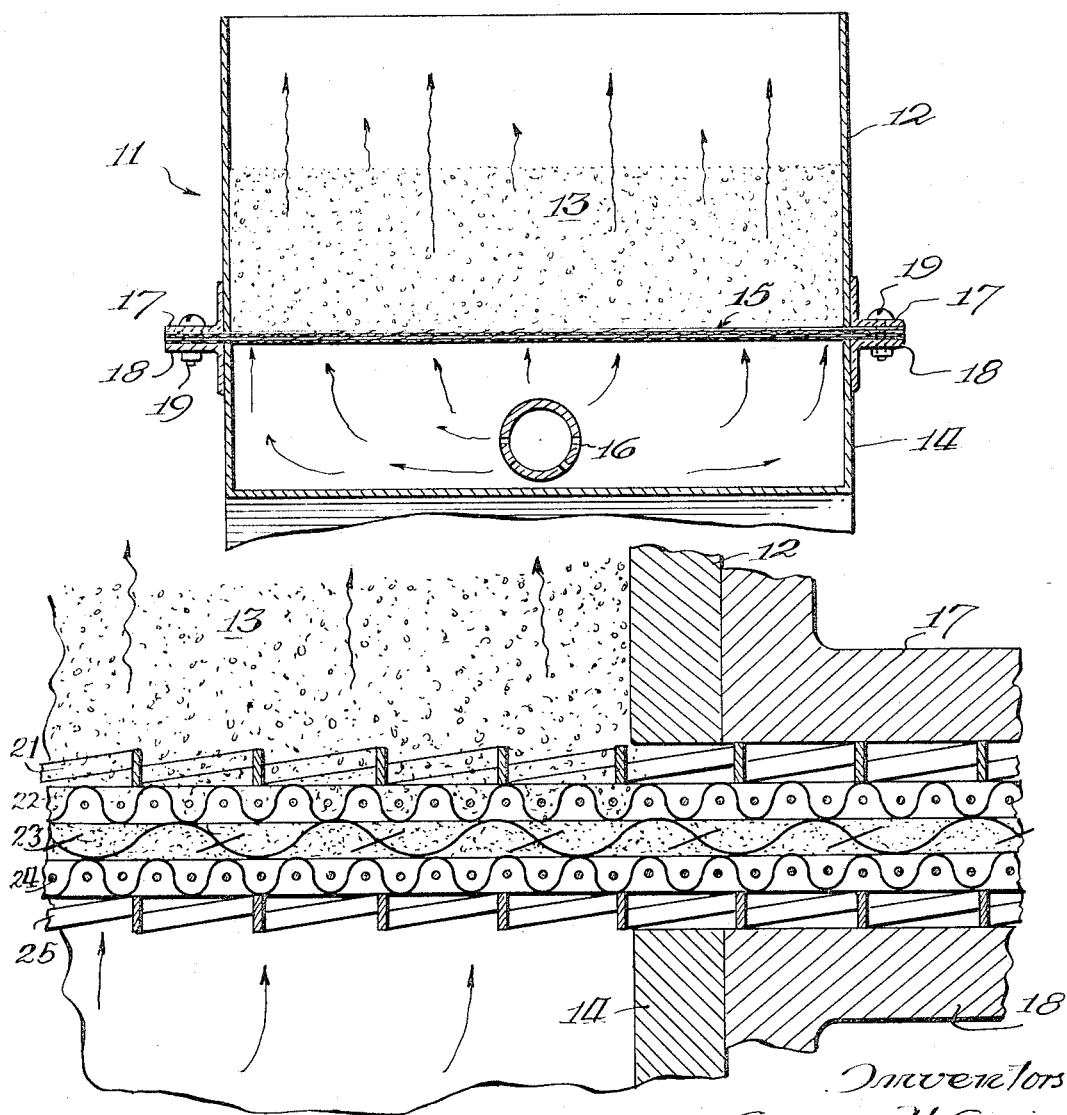
FIGURE 1 is a vertical sectional view illustrating an apparatus for providing an expanded bed to be used in an embodiment of a method in accordance with the present invention.
FIGURE 2 is an enlarged fragmentary view of a portion of the apparatus illustrated in FIGURE 1.

Referring to FIGURE 2, separator 15 is typically composed of five layers, in vertical sequence, from top to bottom, as follows: an uppermost layer of expanded metal grating 21, a layer of metal wire mesh 22, a diaphragm or membrane 23 typically consisting of closely woven synthetic fabric such as nylon or Orlon, a layer of metal wire mesh 24, and a layer of expanded metal grating 25.

In a typical embodiment, dry compressed air is introduced through a conduit 16 into a plenum 14 from where it passes upwardly through separator 15 which disperses the air evenly through the bed of beads 13; and eventually the air passes out through the open top of upper chamber 12. By controlling the rate of gas flow, a condition of incipient fluidization can be provided in the bed of beads 13.

Figure 3:
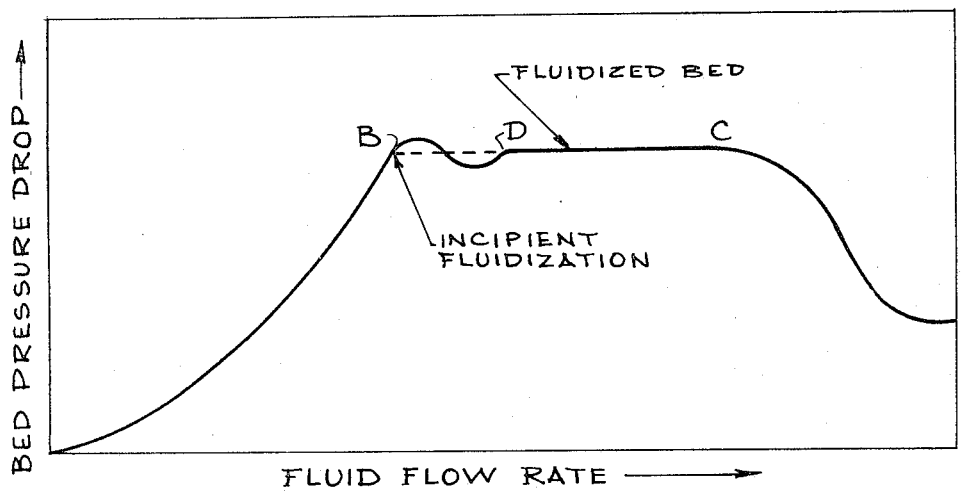
FIGURE 3 is a graph plotting bed pressure drop against fluid flow rate in a fluidized bed.

Referring to FIGURE 3, there is illustrated a curve plotting the pressure drop in a fluidized bed against the flow rate of the fluid through the bed. FIGURE 3 is exemplary with respect to a typical fluidized bed. As the flow rate increases, the curve will assume substantially the shape shown in FIGURE 3. Incipient fluidization is that portion of the curve between points B and D. The beginning of incipient fluidization may be defined as a quiescent quicksand condition, which occurs at point B on the curve of FIGURE 3. As the fluid flow rate continues to increase, eventually a considerable amount of bed motion can be observed in the center of the bed. This is the end of incipient fluidization and the beginning of a completely fluidized condition in the bed, and this would occur at point D on the curve of FIGURE 3.

When the bed is in a completely fluidized condition, the upper boundary of the bed may exhibit substantial level fluctuation. This characteristic would make it extremely difficult to obtain a uniform depth of bead coating from article to article, and would be undesirable in situations where a large number of uniformly coated articles are to be produced. More specifically, there are situations in which the article to be coated with beads has a pigmented binder applied thereto along an area greater than that area to which it is desired to apply the beads. For example, with reference to the post 10, the latter may have paint applied thereon from end 30 to the dash-dot line 31; and it may be desired to apply glass beads from end 30 only to dash-dot line 32. In such a situation, it is extremely important that the top of the bed of beads be level, with no fluctuations.

When the bed is in a condition of incipient fluidization, the top of the bed will remain almost motionless. Accordingly, it is important that the fluid flow rate be controlled, in accordance with the present invention, so that the bed is in a condition of incipient fluidization rather than complete fluidization.

At the other extreme, if the fluid flow rate is too low (i.e., below the point B on the curve of FIGURE 3), it will be difficult to apply an even coating of beads to that portion of the binder-covered article immersed into the bed. This is because the friction between the beads remaining in the bed and the beads initially applied to the article will cause some of the beads to be rubbed off the article as it is being withdrawn from the bed of beads.

Under some conditions, an expanded bed will not display the sinusoidal shape illustrated between points B and D in the curve of FIGURE 3. However, in any event, the boundaries of incipient fluidization can be determined by the quiescent quicksand condition which marks the beginning of incipient fluidization, and by the start of considerable bed motion in the center of the bed which marks the end of incipient fluidization and the beginning of complete fluidization.

A more detailed and technical discussion of incipient fluidization may be found in the following publications:

Brown, George G. and associates, Unit Operations, John Wiley and Sons, 1950, pages 269, 270;

Leva, Max, Fluidization, McGraw-Hill Book Company, 1959, pages 62, 68, Chapter 4, pages 101, 102;

Othmer, Donald F., Fluidization, Reinhold Publishing Corporation, 1956, pages 10–12, 107–109.

Therefore, by controlling the rate of fluid flow to produce conditions of incipient fluidization in a bed of beads, and by dipping a binder-covered portion of an article into the bed of beads maintained in a condition of incipient fluidization, there will be produced an article having at least a portion thereof covered with an evenly distributed coating of beads, one bead thick. This is the minimum number of beads for producing the desired result, so that the method has substantial economic advantages from the standpoint of conservation of the relatively expensive beads.

The beads to be used in accordance with the method of the present invention are conventional and may be composed of glass transparent synthetic resin of suitable refractive index. Preferably, the beads provide retroreflectivity. The beads may be from 3 to 50 mils in diameter, with 4 to 10 mils being preferable. The size of the beads determines the thickness of binder required to support the beads.

The binder is conventional and may be paint, or may be alkyd resins or thermo-setting urea-formaldehyde resin in an organic solvent. More detailed descriptions of beads and binders conventionally used to provide reflective coatings are given in the following U.S. Letters Patents: Gebhard et al., No. 2,326,634; Palmquist et al., No. 2,407,680; and Taylor, No. 2,713,286.

Preferably, dry air is used as the fluid which is circulated through the bed of beads 13. This improves the flow characteristics of the beads, and facilitates curing when a thermo-setting type of binder is being used. Heating of the bead-coated article facilitates drying and curing of the thermo-setting type of binder.

As previously indicated, the method of the present invention is especially suited for coating elongated articles with an irregular lateral cross-sectional shape.

The foregoing detailed description has been given for clearness of understanding only, and no unnecessary limitations should be understood therefrom, as modifications will be obvious to those skilled in the art.

What is claimed is:

1. A method for applying an even light-reflective coating to an elongated article having an irregular lateral cross-section which varies in thickness, said method comprising:

providing said article to be coated;

providing an expanded bed of light-reflecting beads in a condition of incipient fluidization, wherein said bed has a top which is substantially motionless;

covering a predetermined area of the surface of said article with a binder for said beads, said binder being in a tacky condition;

immersing at least a portion of said binder-covered area of the article in said expanded bed while the bed is maintained in said condition of incipient fluidization during the entire time of immersion, to coat said portion with an even coating of said beads;

and then withdrawing said coated article from said bed.

2. A method as recited in claim 1 wherein:

said binder is pigmented;

said elongated article is covered with said pigmented binder a first predetermined distance along the length of said article;

and the binder-covered portion of said article is immersed in said expanded bed a second predetermined distance, along said length of the article, less than said first predetermined distance.

3. A method as recited in claim 1 wherein said beads are transparent, have a composition selected from the group consisting essentially of glass and synthetic resins, and have a diameter between 3 and 50 mils.

4. A method as recited in claim 1 wherein said article to be coated has a plurality of laterally extending flanges joined at an inside corner.

5. A method as recited in claim 1 wherein:

said binder is paint;

and said paint is dried following said withdrawal from the bed.

6. A method as recited in claim 1 wherein:

said binder is a thermo-setting resin;

and said coated article is heated to cure said resin following said withdrawal.

7. A method for applying an even, light-reflective coating to an article, said method comprising:

providing said article to be coated;

providing an expanded bed of light-reflecting beads in a condition of incipient fluidization;

covering a predetermined area of the surface of said article with a binder of said beads, said binder being in a tacky condition;

immersing at least a portion of said binder-covered area of the article in said expanded bed while the bed is maintained in said condition of incipient fluidization during the entire time of immersion, to adhere an even coating of beads to the binder on said immersed portion;

and then withdrawing said coated article from said bed.

References Cited by the Examiner

UNITED STATES PATENTS

| Re. 18,351 | 2/1932 | Hanington | 117—25 |
|---|---|---|---|
| 2,326,634 | 8/1943 | Gebhard et al. | 88—82 |
| 2,407,680 | 9/1946 | Palmquist et al. | |
| 2,411,222 | 11/1946 | Meigs. | |
| 2,581,549 | 1/1952 | McGaugh. | |
| 2,804,417 | 8/1957 | Cross et al. | 117—29 X |
| 3,037,885 | 6/1962 | Abolins | 117—33 X |
| 3,061,943 | 11/1962 | Bennett et al. | 34—95 |
| 3,099,493 | 7/1963 | De Hart et al. | 302—29 |

(Other references on following page)

FOREIGN PATENTS

| | | |
|---|---|---|
| 1,252,041 | 12/1960 | France. |
| 910,392 | 11/1962 | Great Britain. |
| 110,396 | 12/1960 | Pakistan. |

OTHER REFERENCES

Murphy, W. J., "Fluidization Nomenclature and Symbols," Industrial and Engineering Chemistry, vol. 41, No. 7, June 1, 1949, pp. 1249–1250.

Neumann, J. A., and Bockhoff, E. J., "Fluidized Plastic Coatings for Corrosion Resistance," Product Engineering, vol. 28, No. 1, January 1957, pp. 140–143.

WILLIAM D. MARTIN, *Primary Examiner.*

G. L. HUBBARD, M. SOFOCLEOUS,
*Assistant Examiners.*